(12) United States Patent
Peck et al.

(10) Patent No.: US 6,823,221 B2
(45) Date of Patent: Nov. 23, 2004

(54) MOTION CONTROL SYSTEM AND METHOD WHICH INCLUDES IMPROVED PULSE PLACEMENT FOR SMOOTHER OPERATION

(75) Inventors: Joseph Peck, Round Rock, TX (US); Rodger Schorr, Round Rock, TX (US); Neil Feiereisel, Cedar Park, TX (US)

(73) Assignee: National Instruments Corporation, Austin, TX (US)

( * ) Notice: Subject to any disclaimer, the term of this patent is extended or adjusted under 35 U.S.C. 154(b) by 304 days.

(21) Appl. No.: 09/997,638

(22) Filed: Nov. 28, 2001

(65) Prior Publication Data

US 2003/0100956 A1 May 29, 2003

(51) Int. Cl.[7] ................................................ G05B 11/32
(52) U.S. Cl. ............................. 700/61; 700/63; 700/69; 700/70; 700/71; 700/170; 700/302; 318/696; 318/685; 318/695
(58) Field of Search ............................. 700/61, 63, 69, 700/70, 71, 170, 302; 318/696, 685, 695

(56) References Cited

U.S. PATENT DOCUMENTS

| 5,425,005 A | | 6/1995 | Urabe et al. |
| 5,513,096 A | * | 4/1996 | Casler et al. .................. 700/20 |
| 5,932,987 A | | 8/1999 | McLoughlin |
| 6,035,265 A | * | 3/2000 | Dister et al. ................. 702/183 |
| 6,194,863 B1 | | 2/2001 | Mainberger |
| 6,590,366 B1 | * | 7/2003 | Browning et al. ............. 322/49 |

* cited by examiner

*Primary Examiner*—Ramesh Patel
(74) *Attorney, Agent, or Firm*—Meyertons Hood Kivlin Kowert & Goetzel, P.C.; Jeffrey C. Hood (57) ABSTRACT

A motion control system and method are disclosed which provide improved pulse placement for smoother operation of a motion device such as a stepper motor. A placement of pulses may be determined for each of a plurality of time intervals such that the pulses are placed evenly across the plurality of time intervals, wherein the quantity of pulses in each of the time intervals is variable. The pulses may be generated and sent to the motion device to move the object to the desired position. A delay may be used to place each pulse at an arbitrary location within one of the time intervals. Where the desired step rate is fractional, time may be "borrowed" for one loop iteration from other loop iterations. In one embodiment, the step rate may be changed from one loop period to the next.

70 Claims, 10 Drawing Sheets

FIG. 4A: 700k steps/sec (PRIOR ART)

FIG. 4B: 700k steps/sec

*FIG. 4C: 200k steps/sec (PRIOR ART)*

*FIG. 4D: 200k steps/sec*

*FIG. 4E: 10k steps/sec (PRIOR ART)*

*FIG. 4F: 10k steps/sec*

MOTION CONTROL SYSTEM AND METHOD WHICH INCLUDES IMPROVED PULSE PLACEMENT FOR SMOOTHER OPERATION

FIELD OF THE INVENTION

The present invention relates generally to motion control. More particularly, the present invention relates to a system wherein a motion control system uses pulses to instruct a motion device to move an object.

DESCRIPTION OF THE RELATED ART

Motion control is a broad term that may be defined as the precise control of anything that moves. A motion system typically comprises five major components: 1) the moving mechanical device; 2) the motor (servo or stepper motor) with feedback and motion I/O; 3) the motor drive unit; 4) the intelligent controller; and 5) the programming/interface software. Scientists and engineers typically use servo and stepper motors for position and velocity control in a variety of electromechanical configurations.

In particular, stepper motor systems typically include a controller, a power drive, and a stepper motor. The controller is able to generate step pulses to command the drive to move the motor (and therefore the object that is desired to be moved) an incremental movement often called a "step." The drive accepts these pulses and generates the high currents and voltages necessary to move the motor. The frequency of the step pulses controls velocity, the rate of change controls acceleration, and the total number of pulses controls the position.

Prior motion control systems have used proprietary control hardware to control the motion system. These proprietary systems have suffered from high cost and limited flexibility. More recently, computer systems are being used in motion control systems. The computer system may serve as the operator interface or human machine interface (HMI) as well as the local control host in the remote system controller platform. The use of personal computers in motion control is widely accepted and growing at a significant pace. While many motion control solutions today still use standalone distributed motion control and closed architecture systems, computer-based motion solutions provide added flexibility and the potential for lower system cost.

In computer-based stepper motion control systems, it is common to segment the total motion into short time intervals. During each interval (i.e., each iteration of the loop), the controller decides where the motor should be at the end of the interval. The controller then outputs the number of step pulses equal to the difference between the target position and the current position. It is also common practice to evenly distribute the required number of pulses across the loop period. However, this even distribution can result in significant short-term velocity and position error.

For example, for a loop period of 10 clocks and a step rate of 7 clocks, steps may be generated as follows according to the prior art method:

| Period | 1 | 2 | 3 | 4 | 5 | 6 | 7 |
|---|---|---|---|---|---|---|---|
| Target Position | 1.4 | 2.9 | 4.3 | 5.7 | 7.1 | 8.6 | 10 |
| Steps to generate | 1 | 1 | 2 | 1 | 2 | 1 | 2 |
| Actual step rate | 10 | 10 | 5 | 10 | 5 | 10 | 5 |

Figure 4A:
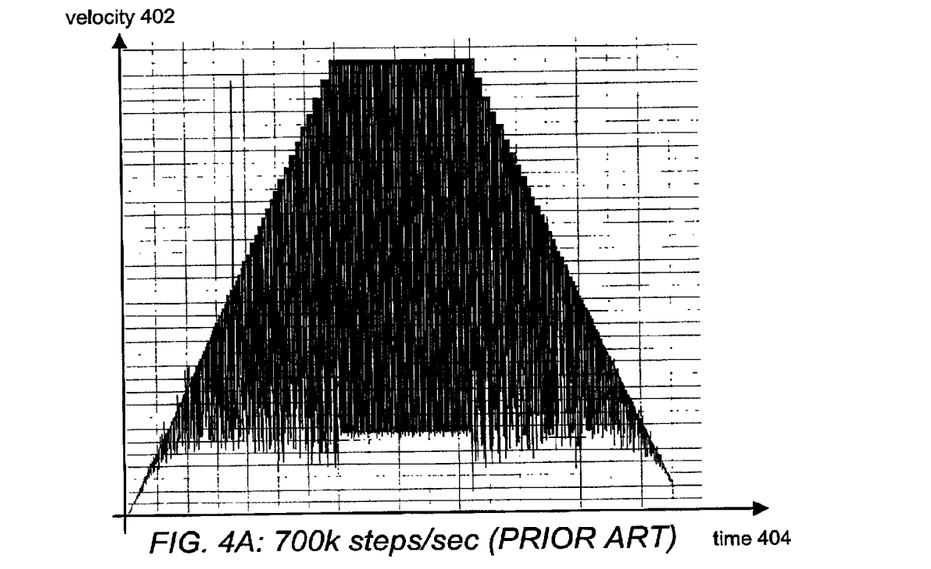
FIGS. 4A, 4C, and 4E illustrate example graphs of velocity versus time in a motion control system according to the prior art.

Because the motion control systems of the prior art use integer values for steps, the instantaneous step rate (i.e., the step rate per period) is either 5 or 10 clocks even though the average step rate is 7 clocks. FIG. 4A illustrates a typical graph (of velocity versus time) having significant short-term error according to the prior art motion control system and method.

Prior art motion control systems also suffer from quantization errors, primarily because they can only output step rates that are an integer number of clock cycles. If a digital motion control system can only output step rates that are an integer number of clocks, for example, then it can only choose a step rate of 2 or 3 clocks (rather than an ideal 2.4 clocks, for example). If it uses a step rate of 2 clocks, then the pulse train will end early in the period and leave dead time that creates jumps in velocity. If it uses a step rate of 3 clocks, the pulse train will not finish by the end of the period and will run into the next period.

Therefore, an improved system and method is desired for motion control using improved pulse placement for smoother operation.

SUMMARY OF THE INVENTION

One embodiment of the present invention includes a motion control system and method which provides improved pulse placement for smoother operation of a motion device such as a stepper motor. Although prior art implementations typically do generate the correct number of steps at the correct average velocity, they do so at the expense of short-term error. At both high and low velocities, the motion control system and method as described herein will typically result in smoother operation as well as achieve positional accuracy through accurate pulse placement.

The motion device (e.g., a stepper motor) is operable to move an object. The motion device is coupled to a motion control system which may include a computer system and a motion controller. The motion control system may include a processor and a memory medium, wherein the memory medium stores a motion control software program which is executable by the processor. A power drive may be coupled between the motion device and the motion control system. The power drive may be operable to receive the pulses from the motion control system, translate the pulses into power signals, and send the power signals to the motion device.

In one embodiment, to achieve smoother operation, the motion control system and method may place the step pulses more accurately within the loop period. By using a delay time, the pulse train may be shifted to an arbitrary location within the loop period rather than evenly distributed throughout the loop period as in the prior art implementations.

In one embodiment, the motion control system and method may correct for quantization errors in the step generation due to digital clock limits. In one embodiment, the motion control system may generate a pulse train at the slower rate (3 clocks in this example) and correct for the "borrowed time" in the next loop iteration. Instead of assuming that each loop period is constant, according to one embodiment of the motion control system and method, an autocorrecting algorithm removes the borrowed time from its calculations and therefore allows the step generation to catch up at appropriate intervals.

In one embodiment, a further improvement may be made to improve the accuracy of the motion control system and method. By allowing the step rate to change at a programmable point in the middle of the loop iteration (i.e., the series of loop periods), the step pulse generator may allow the steps generated to consume only the loop period and thus eliminate the borrowing of time from future loop periods.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT

Figure 1:
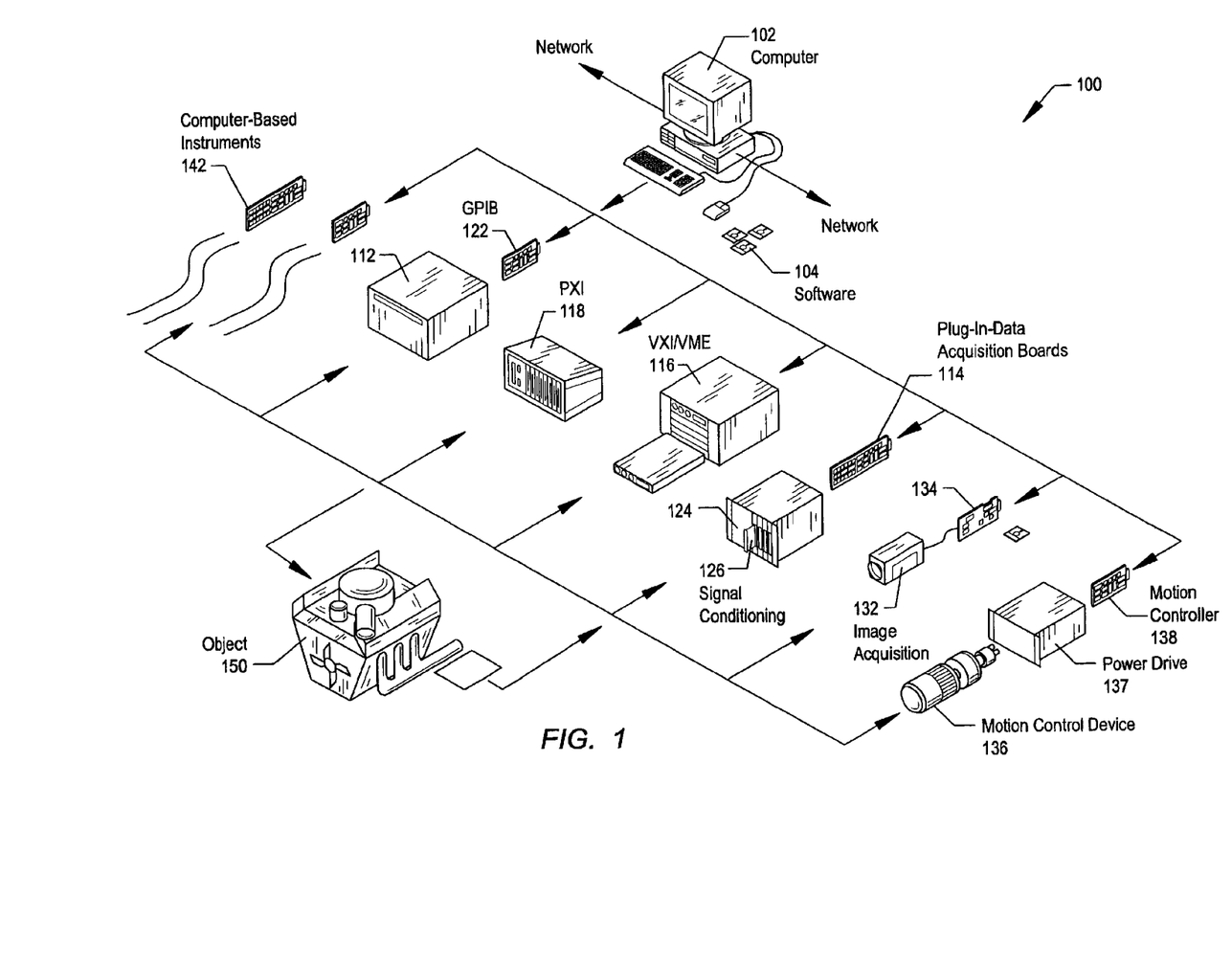
FIG. 1 illustrates an example of a system for motion control and measurement including an object being scanned according to one embodiment.

FIG. 1—Exemplary Motion Control/Measurement System

FIG. 1 illustrates an example motion control system 100 that includes various options for measurement or data acquisition. The motion control system may be configured to move object 150 and/or scan object 150 while object 150 is being moved. FIG. 1 is exemplary only, and the present invention may be used in any of various systems, as desired.

The system 100 includes a host computer 102. The host computer 102 comprises a CPU, a display screen, memory, and one or more input devices such as a mouse or keyboard as shown. The computer 102 couples to a motion control system including a motion device 136 and a motion control interface card 138. As used herein, the term "motion device" or "motion control device" is intended to include stepper motors, servo motors, and other motion control devices or systems that are operable to receive a motion control signal and move responsive to the received signal. Typically an object is placed on or otherwise coupled to the motion device, and the motion device operates to move the object. The motion device 136 is coupled to the computer 102 through the motion control interface card 138. The motion control interface card 138 is typically plugged into an I/O slot in the computer 102, such as a PCI bus slot provided by the computer 102. However, the card 138 is shown external to computer 102 for illustrative purposes. The card 138 may also be implemented as an external device coupled to the computer 102. In one embodiment, a power drive or wiring interface 137 may convert control signals from the motion control interface card 138 into current and voltage power signals for the motion device 136.

The computer system 102 may also couple to one or more measurement devices which may be used, for example, to acquire measurements of an object 150 which is moved by the motion control device 136. The one or more measurement devices may include a GPIB instrument 112 and associated GPIB interface card 122, a data acquisition (DAQ) board 114 and associated signal conditioning circuitry 124, a VXI/VME instrument 116, a PXI instrument 118, a video device 132 and associated image acquisition card 134, and/or one or more computer based instrument cards 142, among other types of measurement or data acquisition devices.

The GPIB instrument 112 is coupled to the computer 102 via a GPIB interface card 122 provided by the computer 102. In a similar manner, the video device 132 is coupled to the computer 102 via the image acquisition card 134. The data acquisition board 114 is coupled to the computer 102, and optionally interfaces through signal conditioning circuitry 124 to the UUT. The signal conditioning circuitry 124 preferably comprises a SCXI (Signal Conditioning eXtensions for Instrumentation) chassis comprising one or more SCXI modules 126.

As described above with respect to the motion control interface card 138, the GPIB card 122, the image acquisition card 134, and the DAQ card 114 are typically plugged in to an I/O slot in the computer 102, such as a PCI bus slot provided by the computer 102. However, these cards 122, 134 and 114 are shown external to computer 102 for illustrative purposes. The cards 122, 134 and 114 may also be implemented as external devices coupled to the computer 102, such as through a serial bus.

The VXI/VME chassis or instrument 116 is coupled to the computer 102 via a serial bus, MXI bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102.

Figure 2:
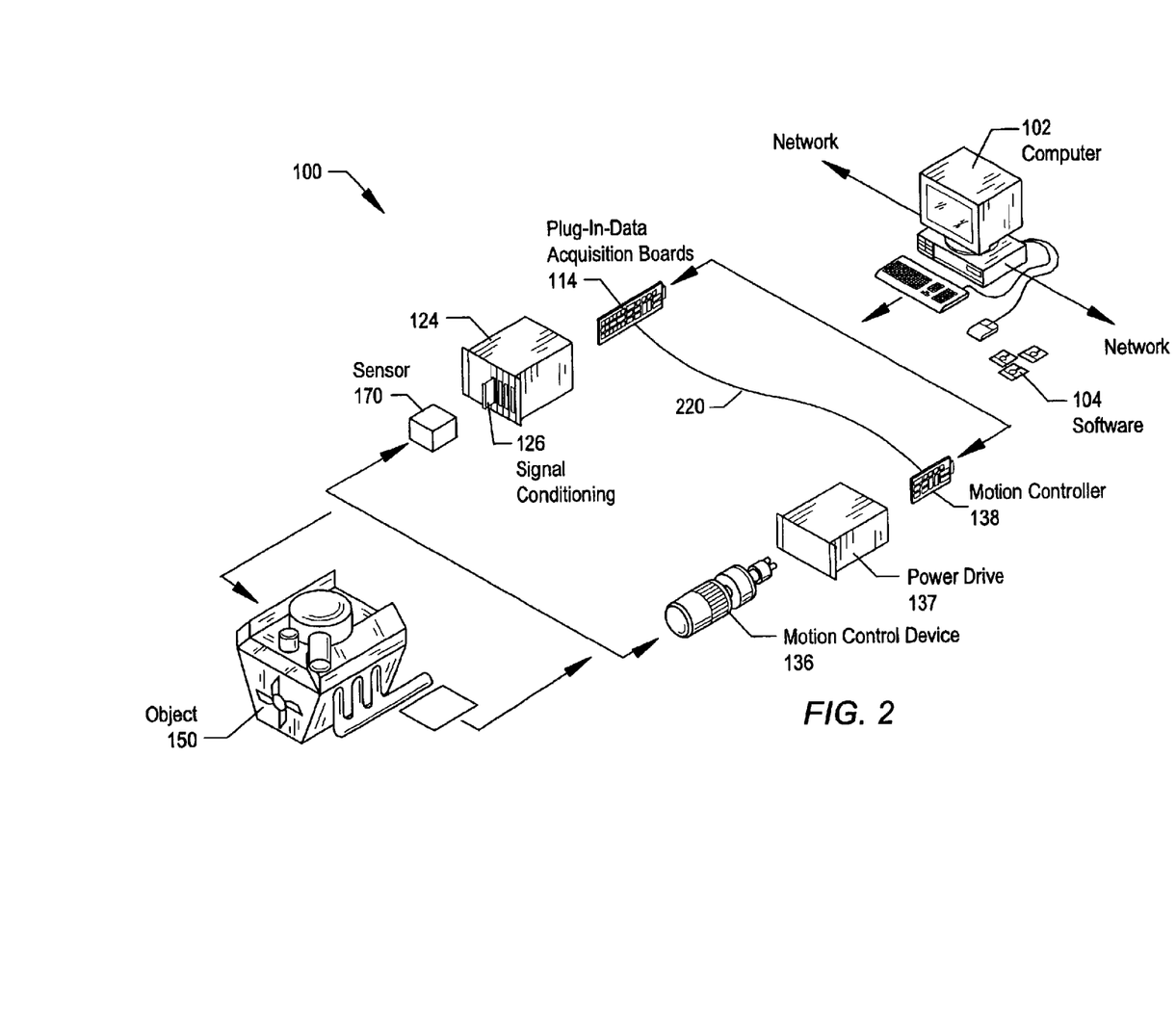
FIG. 2 illustrates an example of a motion control system according to one embodiment.

FIG. 2—Exemplary Motion Control System for Scanning an Object

FIG. 2 illustrates an example motion control system of FIG. 1, wherein the system includes motion control interface device 138 and a data acquisition device 114. The motion control interface device 138 may be coupled to move a sensor 170 to scan an object. The sensor 170 may be operable to acquire measurements of the object 150 being scanned. The data acquisition device 114 may be coupled to the sensor 170 to acquire data or measurements from the sensor 170.

As shown, the motion control interface device 138 is directly coupled with the measurement device through a dedicated channel to provide real time triggering and/or communication between the motion control interface device 138 and the data acquisition device 114. The computer 102 may operate to receive and integrate or correlate the position data and measurements received from the motion control interface card 138 and data acquisition device 114, respectively, as described below.

Figure 2A:
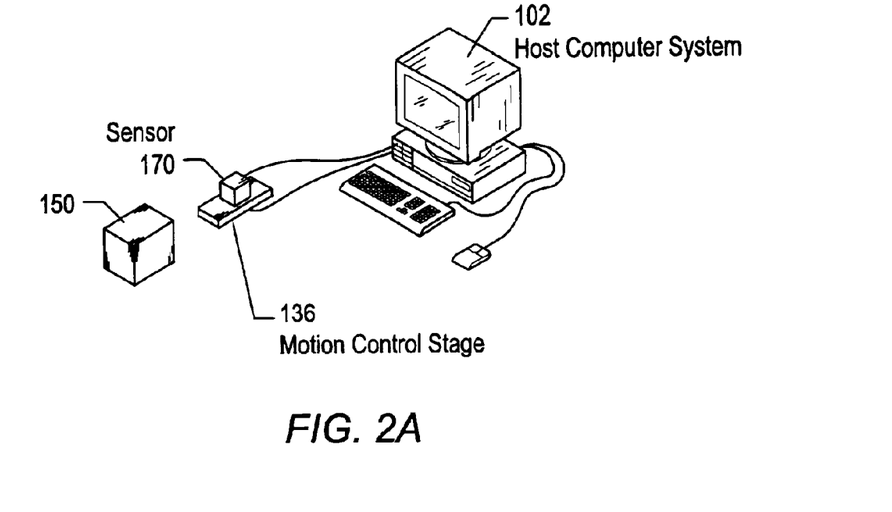
FIG. 2A illustrates an example of a motion control system having a motion control interface device and a data acquisition device comprised within a computer system according to one embodiment.

FIG. 2A illustrates an example motion control system wherein the motion control interface device 138 and data acquisition (or measurement) device 114 (not shown in FIG. 2A) are comprised in computer system 102. The motion control interface device 138 controls motion control stage 136, which moves sensor 170 relative to the object 150 being scanned. The data acquisition device 114 is operable to acquire data sensed by the sensor 170.

Figure 2B:
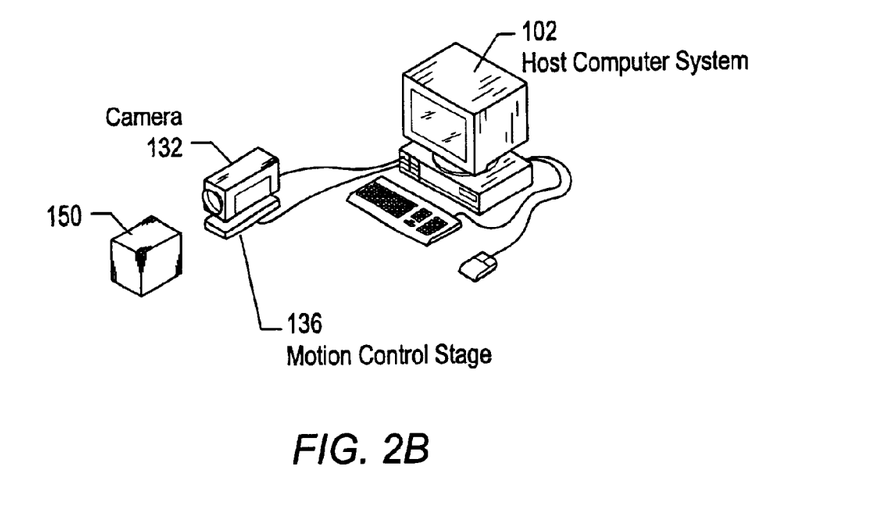
FIG. 2B illustrates an example of a motion control system having a motion control interface device and an image acquisition device comprised within a computer system according to one embodiment.

FIG. 2B illustrates an example motion control system wherein the motion control interface device 138 and image acquisition (or measurement) device 134 (not shown in FIG. 2B) are comprised in computer system 102. The motion control interface device 138 controls motion control stage 136, which moves camera 132 relative to the object 150 being scanned. Here the camera 132 is simply one example of a sensor 170. The image acquisition device 134 is operable to acquire data sensed by the camera 132.

Figure 3:
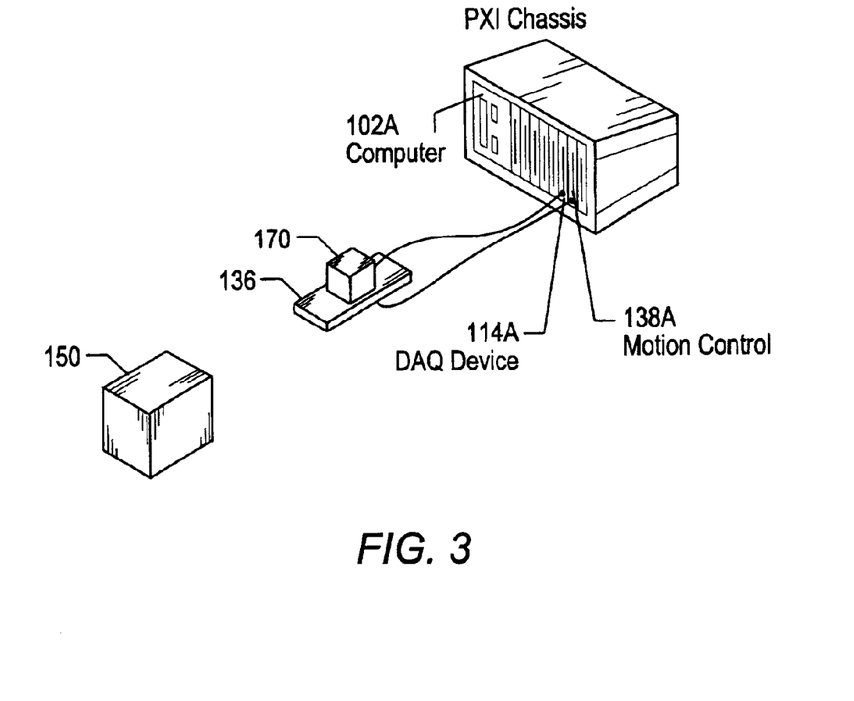
FIG. 3 illustrates an example of a motion control system having a PXI chassis including a computer card, motion control interface card, and measurement device according to one embodiment.

FIG. 3—Exemplary PXI-Based Motion Control System

FIG. 3 illustrates an example motion control system of FIG. 1, wherein the system includes a PXI chassis 118 comprising a computer card 102A, motion control interface card 138A and a measurement device, such as data acquisition device 114A. The motion control interface card 138A is similar to the motion control interface card 138, except that the motion control interface card 138A is in a PXI card form factor. Similarly, the data acquisition device 114A is similar to the data acquisition device 114, except that the data acquisition device 114A is in a PXI card form factor.

As described above with respect to FIG. 2, the motion control interface device 138A may be coupled to move a sensor 170 to scan an object. The sensor 170 may be operable to acquire measurements of the object 150 being scanned. The data acquisition device 114A may be coupled to the sensor 170 to acquire data or measurements from the sensor 170.

In this embodiment, the motion control interface device 138 is directly coupled with the measurement device through dedicated trigger and/or communication lines provided in the PXI backplane. Thus the PXI backplane provides real time triggering and/or communication between the motion control interface device 138A and the data acquisition device 114A. The computer or controller board 102A may be comprised in the PXI chassis to receive and integrate or correlate the position data and measurements received from the motion control interface card 138A and data acquisition device 114A, respectively, as described below.

FIG. 4—Examples Graphs Showing Smoother Operation in Various Embodiments

FIGS. 4A through 4F illustrate differences between motion control systems according to the prior art and according to embodiments of the present invention.

Figure 4B:
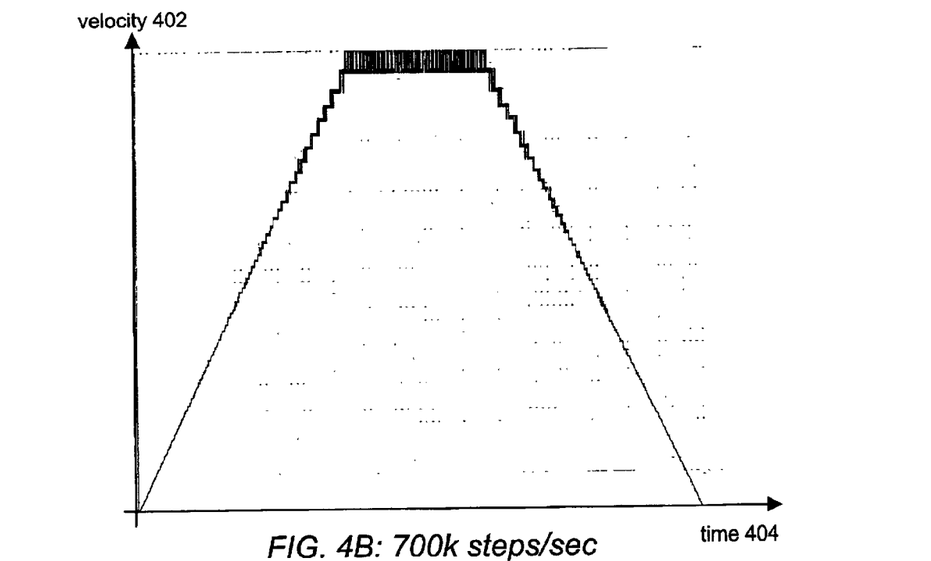
FIGS. 4B, 4D, and 4F illustrate example graphs of velocity versus time in a motion control system providing smoother operation according to various embodiments.

FIG. 4A illustrates an example graph of velocity 402 versus time 404 at 700,000 steps per second in a motion control system according to the prior art. FIG. 4B illustrates an example graph of velocity 402 versus time 404 at 700,000 steps per second in a motion control system providing smoother operation according to one embodiment.

Figure 4C:
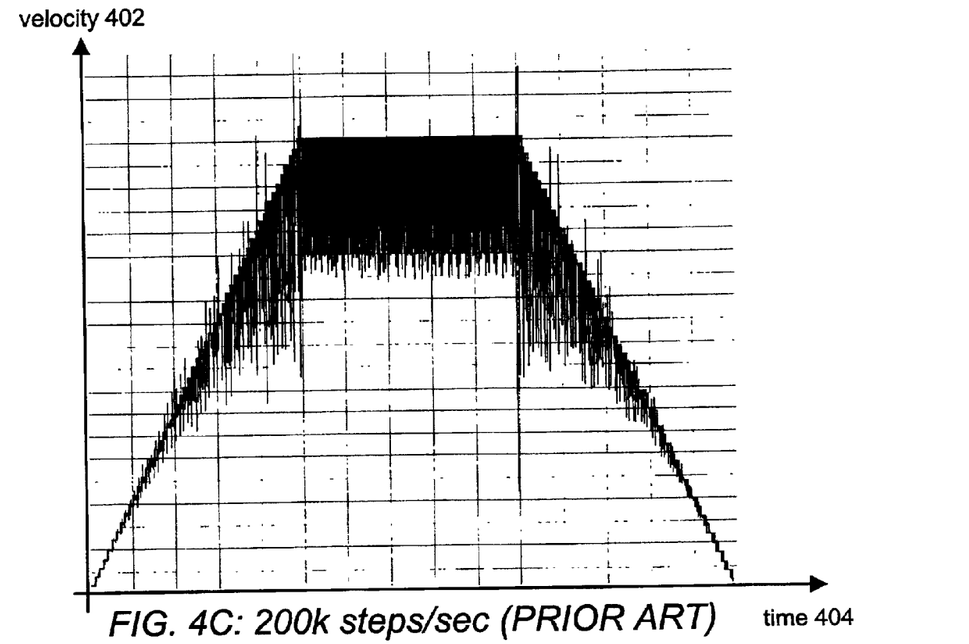
Figure 4D:
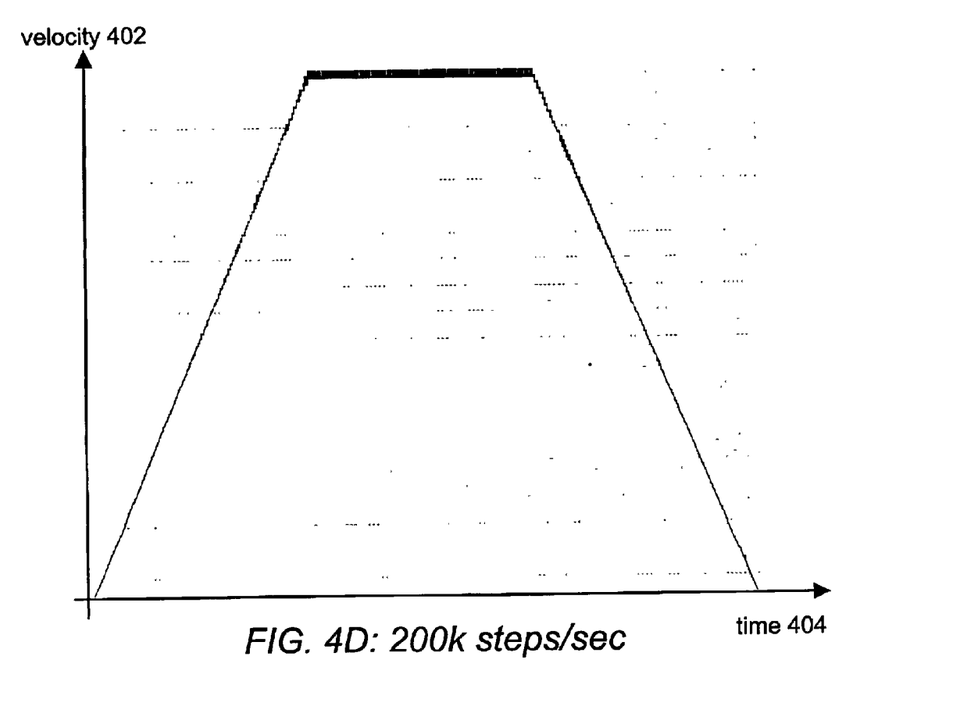

FIG. 4C illustrates an example graph of velocity 402 versus time 404 at 200,000 steps per second in a motion control system according to the prior art. FIG. 4D illustrates an example graph of velocity 402 versus time 404 at 200,000 steps per second in a motion control system providing smoother operation according to one embodiment.

Figure 4E:
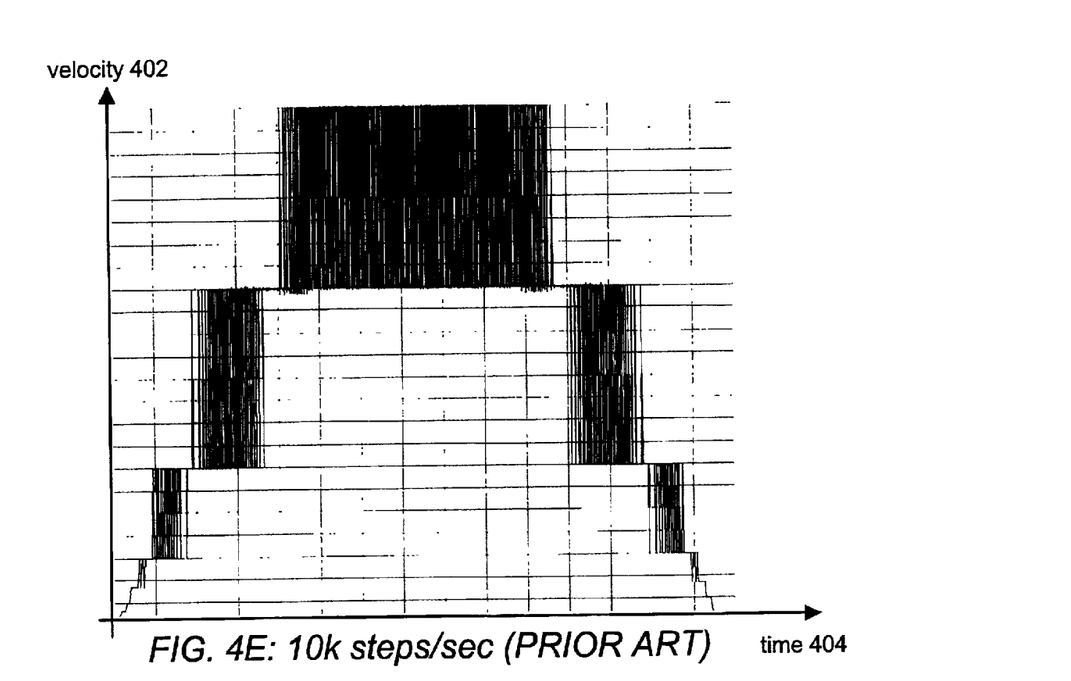
Figure 4F:
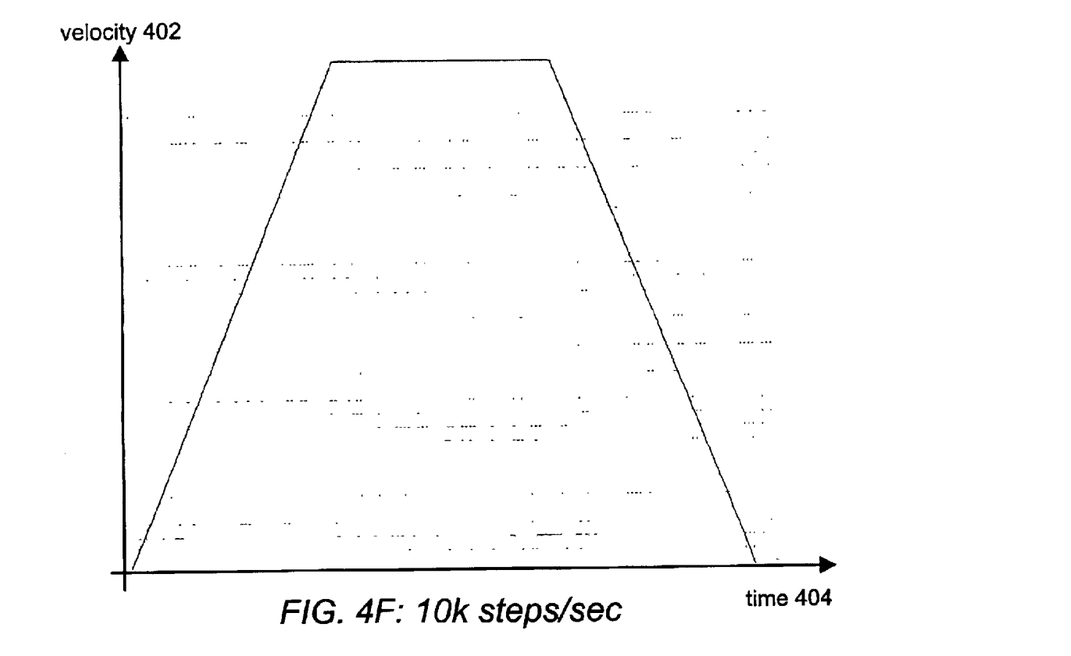

FIG. 4E illustrates an example graph of velocity 402 versus time 404 at 10,000 steps per second in a motion control system according to the prior art. FIG. 4F illustrates an example graph of velocity 402 versus time 404 at 10,000 steps per second in a motion control system providing smoother operation according to one embodiment.

Each of the graphs may represent thousands of steps needed by the motion device to reach a desired position. Although the prior art implementations as illustrated by way of example in FIGS. 4A, 4C, and 4E typically do generate the correct number of steps at the correct average velocity, they do so at the expense of short-term error as shown in the "choppiness" of FIGS. 4A, 4C, and 4E.

The motion control system and method according to one embodiment may place the step pulses more accurately within the loop period. By using a delay time, the pulse train may be shifted to an arbitrary location within the loop period rather than evenly distributed throughout the loop period as in the prior art implementations. As shown in the following example using a loop period having a duration of 10 clocks and a step rate of 7 clocks, the use of delays according to one embodiment results in smoother motion than the "jerky" prior art method:

| Step pulse | 1 | 2 | 3 | 4 | 5 | 6 | 7 | 8 |
|---|---|---|---|---|---|---|---|---|
| Prior art location | 10 | 20 | 25 | 30 | 40 | 45 | 50 | 60 |
| Delay location | 7 | 14 | 21 | 28 | 35 | 42 | 49 | 56 |

The motion control system and method according to one embodiment may correct for quantization errors in the step generation due to clock limits in the digital system. For example, suppose the step rate in the above example was changed to 2.4 clocks/step per step with a loop period 10 clocks in duration:

| Period | 1 | 2 | 3 | 4 | 5 | 6 | 7 |
|---|---|---|---|---|---|---|---|
| Target Position | 4.2 | 8.3 | 12.5 | 16.7 | 20.8 | 25 | 29.2 |
| Steps to generate | 4 | 4 | 4 | 4 | 4 | 5 | 4 |
| Actual step rate | 3 | 2 | 3 | 2 | 3 | 2 | 2 |
| Clocks in period (including borrowed clocks) | 12 | 8 | 12 | 8 | 12 | 10 | 8 |

If the digital motion control system can only output step rates that are an integer number of clocks, it can only choose a step rate of 2 or 3 clocks (rather than the ideal 2.4 clocks). If it uses a step rate of 2 clocks, then the pulse train will end early in the period and leave dead time that creates jumps in velocity. If it uses a step rate of 3 clocks, the pulse train will not finish by the end of the period and will run into the next period. In one embodiment, the solution is to generate a pulse train at the slower rate (3 clocks in this example) and correct for the "borrowed time" in the next loop iteration. Instead of assuming that each loop period is constant, according to one embodiment of the motion control system and method, the autocorrecting algorithm removes the borrowed time from its calculations and therefore allows the step generation to catch up at appropriate intervals. In the above example, the actual step rate will change between 2 and 3 clocks in order to achieve an average step rate of 2.4 clocks.

In one embodiment, a further improvement may be made to improve the accuracy of the motion control system and method. By allowing the step rate to change at a programmable point in the middle of the loop iteration (i.e., the series of loop periods), the step pulse generator may allow the steps generated to consume only the loop period and thus eliminate the borrowing of time from future loop periods. For example, revisit the first two iterations of the previous example (loop period: 10 clocks; step rate: 2.4 clocks; actual step rate: 2 or 3 clocks) to illustrate the method incorporating changeable step rates (as indicated in the "new location" row):

| Step pulse | 1 | 2 | 3 | 4 | 5 | 6 | 7 | 8 |
|---|---|---|---|---|---|---|---|---|
| Borrowed location | 3 | 6 | 9 | 12 | 14 | 16 | 18 | 20 |
| New location | 3 | 6 | 8 | 10 | 13 | 16 | 18 | 20 |

The borrowing method results in the 4 step pulses of the first iteration being spread out over 12 clocks at a rate of 3 clocks. On the second iteration it generates the step pulses over 8 clocks at a rate of 2 clocks. The method using a changeable loop period results in the 4 step pulses of the first iteration being spread out over 10 clocks at a rate of 3 clocks for the first two steps and 2 clocks for the last two steps. On the second iteration it generates the same step pattern. This method removes the need for the autocorrection of borrowed time and allows for an even more accurate pulse placement within the loop period.

Figure 5:
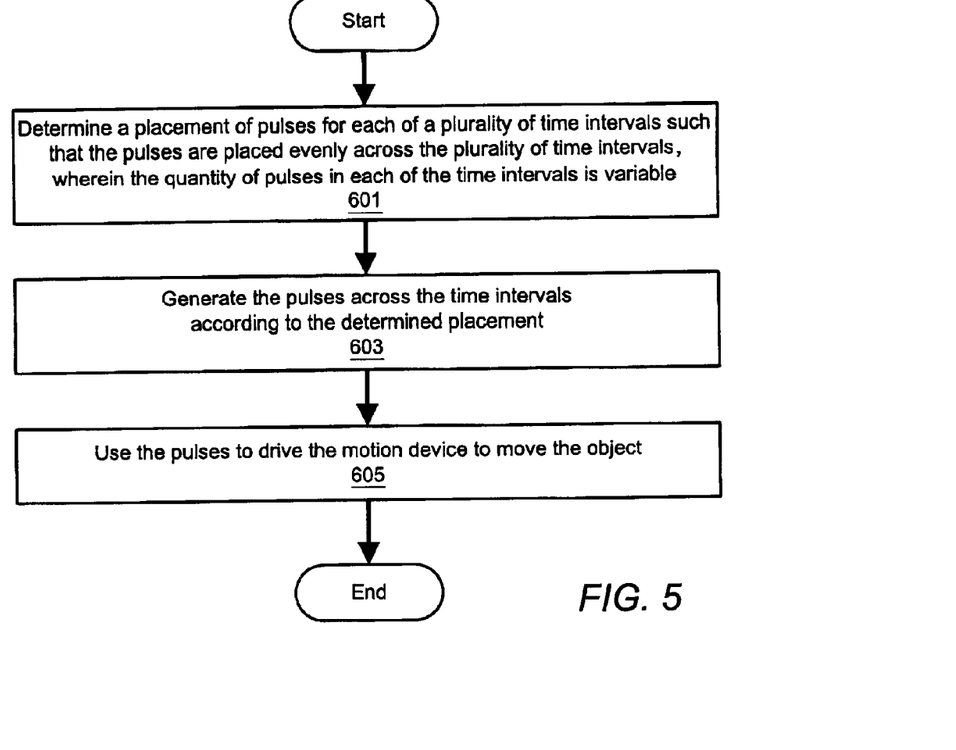
FIG. 5 is a flowchart illustrating a motion control method using improved pulse placement for smoother operation according to one embodiment.
Figure 6:
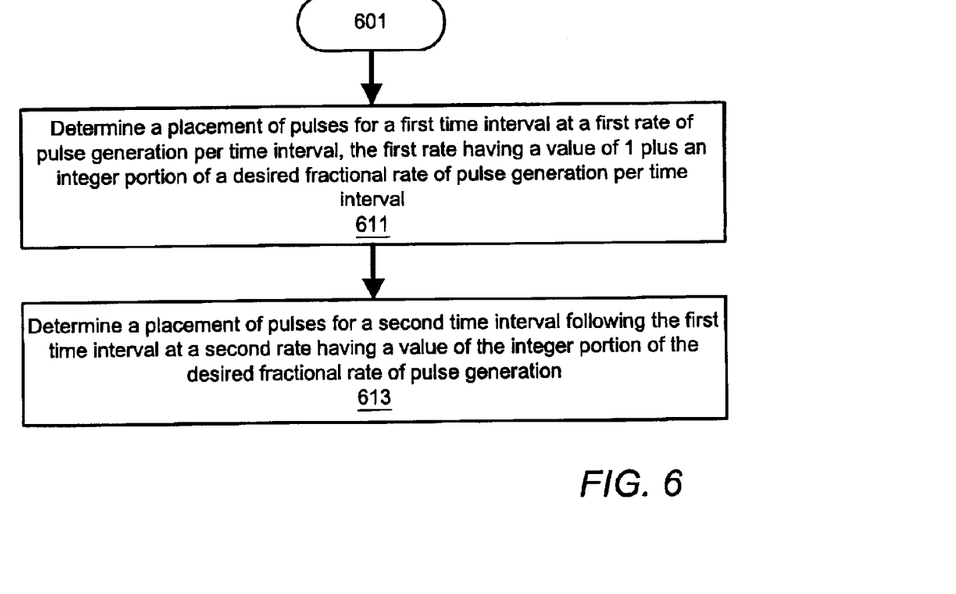
FIG. 6 is a flowchart further illustrating the placement of pulses in a motion control method using improved pulse placement for smoother operation according to one embodiment.
Figure 7A:
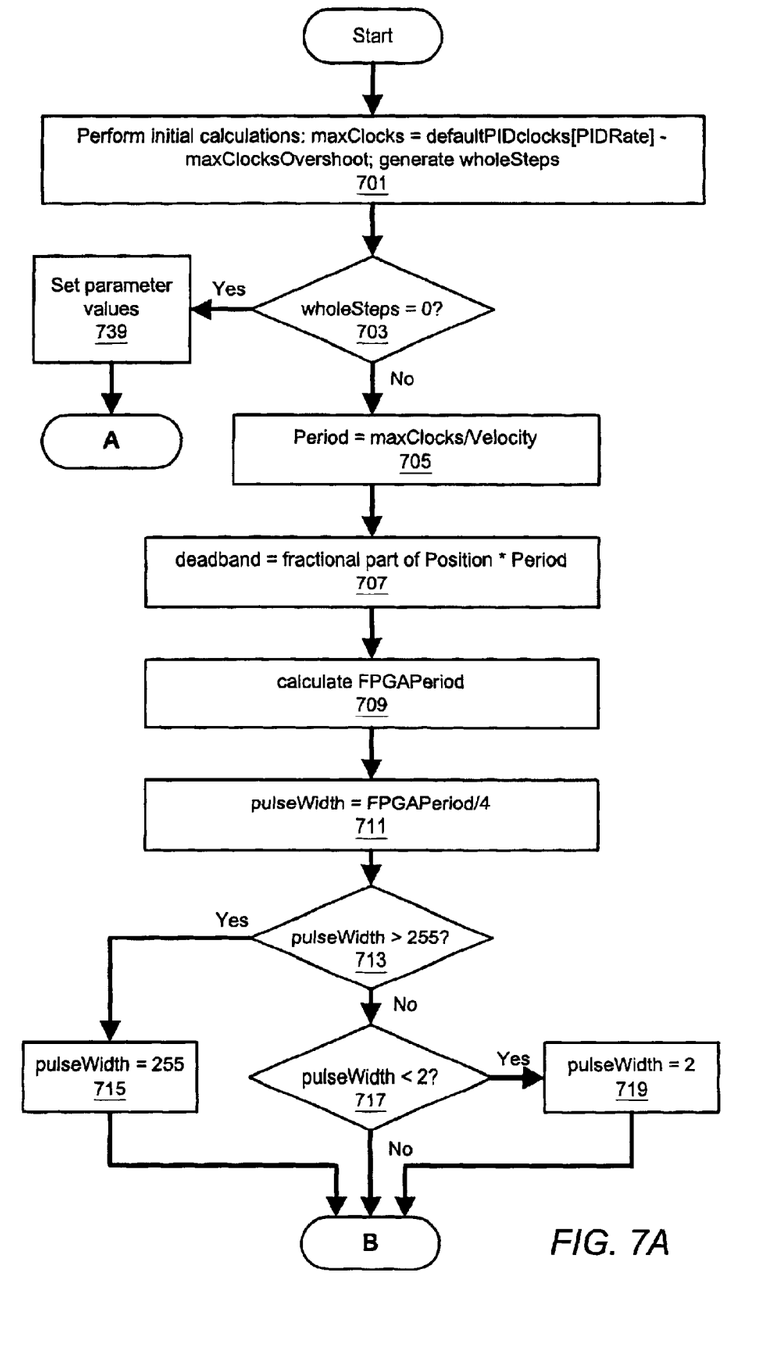
FIGS. 7A–B are flowcharts illustrating an algorithmic motion control method using improved pulse placement for smoother operation according to one embodiment.
Figure 7B:
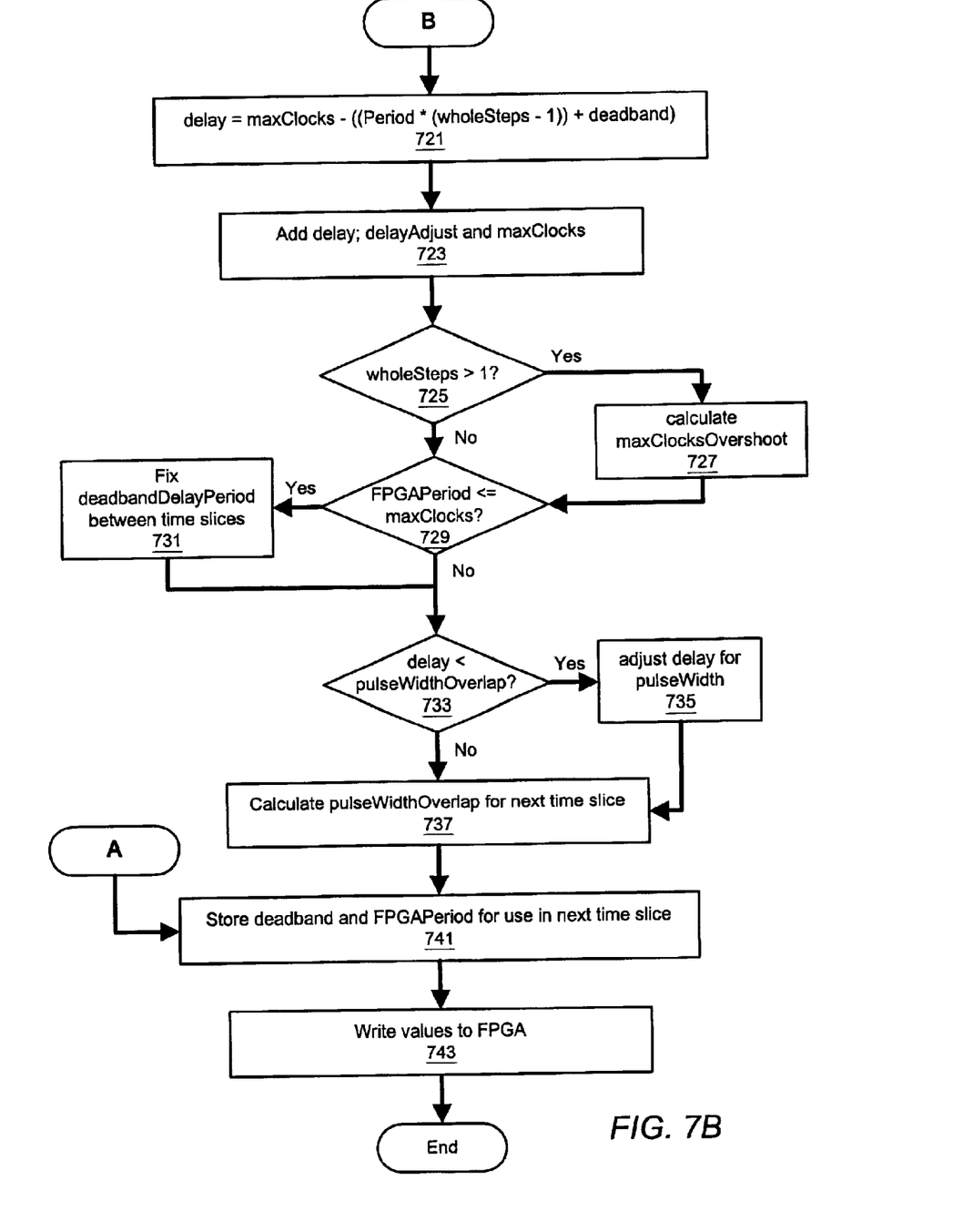

FIGS. 5–7—Flowcharts of the Motion Control Method Featuring Smoother Operation

FIGS. 5, 6, 7A, and 7B are flowcharts further illustrating the motion control method discussed above with reference to FIG. 4B. As discussed with reference to FIGS. 1 through 4, a motion device is operable to move an object. In one embodiment, the motion device includes a stepper motor. A motion control system is coupled to the motion device. The motion control system may include a computer system and a motion controller. The motion control system may include a processor and a memory medium, wherein the memory medium stores a motion control software program which is executable by the processor. A power drive may be coupled to the motion device and the motion control system. The power drive may be operable to receive the pulses from the motion controller, translate the pulses into power signals, and send the power signals to the motion device.

FIG. 5 is a flowchart illustrating a method for controlling motion of an object according to one embodiment. In 601, a placement of pulses may be determined for each of a plurality of time intervals such that the pulses are placed evenly across the plurality of time intervals, wherein the quantity of pulses in each of the time intervals is variable. In 603, the pulses may be generated across the time intervals according to the placement determined in 601. In 605, the pulses may drive the motion device to move the object.

In one embodiment, in determining the placement of pulses for each of the plurality of time intervals, a delay may be used to place each pulse at an arbitrary location within one of the time intervals. The time intervals may be variable or fixed in length in various embodiments. Where the time intervals are fixed in length, a pulse rate may be changed within one of the time intervals.

FIG. 6 is a flowchart further illustrating step 601 from FIG. 6a according to one embodiment. In 611, a placement of pulses may be determined for a first time interval at a first rate of pulse generation per time interval. The first rate may have a value of 1 plus an integer portion of a desired fractional rate of pulse generation per time interval. In 613, a placement of pulses may be determined for a second time interval following the first time interval at a second rate having a value of the integer portion of the desired fractional rate of pulse generation.

At both high and low velocities, the method illustrated in FIGS. 5 and 6 will typically result in smoother operation as well as achieve positional accuracy through accurate pulse placement.

FIGS. 7A and 7B are flowcharts further illustrating a detailed algorithm which implements the method shown FIGS. 5 and 6 according to one embodiment. Although the algorithm of FIGS. 7A and 7B assumes that the motion controller 138 includes a field-programmable gate array (FPGA), the method may be implemented using any suitable motion controller. An FPGA is a semi-conductor device that contains a large quantity of gates (logic devices) which are not interconnected and whose function is determined by a wiring list which is downloaded to the FPGA. The wiring list determines how the gates are interconnected, and this interconnection is performed dynamically by turning semiconductor switches on or off to enable the different connections.

In 701, perform initial calculations such as maxClocks=defaultPIDclocks[PIDRate]−maxClocksOvershoot. The value of wholeSteps may also be generated in 701. The variable maxClocks may store the number of FPGA clock cycles that may be consumed in a given time slice (i.e., loop period). This value may start as defaultPIDClocks for each time slice, but it may be adjusted to account for any borrowed time from the previous time slice. The variable defaultPIDClocks relates to the set number of FPGA clock cycles that can be consumed for each PID rate a user can select (where different PID rates change the size of a time slice). The variable wholesteps represents the number of step pulses that need to be outputted in a given time slice.

In 703, determine whether wholeSteps=0. If wholeSteps=0, then in 739, set parameter values and proceed to 741. If wholeSteps is nonzero, then in 705, assign Period=maxClocks/Velocity. Period is the actual number of FPGA clocks a step pulse should take; in one embodiment, this number may include fractional information.

In 707, assign deadband=fractional part of Position*Period.

In 709, calculate FPGAPeriod as an integer number representing the actual number of FPGA clocks a step pulse will take. In one embodiment, the FPGA cannot use fractional clocks.

In 711, assign pulsewidth=FPGAPeriod/4. The variable pulseWidth stores a step pulse's active time in number of FPGA clocks. In 713, determine whether pulsewidth>255. If pulsewidth exceeds 255, then in 715, assign pulseWidth=255. In 717, determine whether pulsewidth<2. If pulseWidth is less than 2, then in 719, assign pulseWidth=2.

In 721, assign delay=maxClocks−((Period*(wholeSteps−1))+deadband). The variable delay is the number of FPGA clocks before the first step pulse is to be generated in a time slice. The variable deadband is a calculated value representing the time between the start of the last step pulse to be generated and the end of the time slice. This value is used to correctly position step pulses with in a time slice.

In 723, add the delay/Adjust to delay and maxClocks.

In 725, determine whether wholeSteps>1. If wholeSteps is greater than one, then in 727, calculate maxClocksOvershoot. The variable maxClocksOverShoot stores the number of FPGA clocks that are borrowed from the next time slice.

In 729, determine whether FPGAPeriod<=maxClocks. If true, then in 731, fix the deadbandDelayPeriod between time slices. The variable deadbandDelayPeriod may be formed by adding the previous time slice's deadband and the current time slice's delay. This is the period of a step pulse that crosses over the time slice boundary.

In 733, determine whether delay <pulseWidthOverlap. If true, then in 735, adjust delay for pulseWidth. The variable pulseWidthOverlap is the number of FPGA clock cycles that the previous time slice's last step pulse's pulsewidth overlaps into the current time slice.

In 737, calculate pulseWidthOverlap for the next time slice. In 741, store deadband and FPGAPeriod for use in next time slice. In 743, write values to the FPGA. The method may proceed again for a next time slice.

Various embodiments may further include receiving or storing instructions and/or data implemented in accordance with the foregoing description upon a carrier medium. Suitable carrier media may include storage media or memory media such as magnetic or optical media, e.g., disk or CD-ROM, as well as transmission media or signals such as electrical, electromagnetic, or digital signals, conveyed via a communication medium such as network and/or a wireless link.

While the present invention has been described with reference to particular embodiments, it will be understood that the embodiments are illustrated and that the invention scope is not so limited. Any variations, modifications, additions and improvements to the embodiments described are possible. These variations, modifications, additions and improvements may fall within the scope of the invention as detailed within the following claims.

What is claimed is:

1. A system for controlling motion of an object, the system comprising:
   a motion device which is operable to move the object;
   a motion control system which is coupled to the motion device, wherein the motion control system includes a processor and a memory medium, wherein the memory medium stores a motion control software program, wherein the motion control software program is executable by the processor to:
   determine a placement of pulses for each of a plurality of time intervals, wherein the pulses have an average desired pulse rate across the plurality of time intervals, wherein the quantity of pulses in each of the time intervals is variable, wherein in determining the placement of pulses for each of the plurality of time intervals, the motion control software program is executable by the processor to:
      determine a placement of pulses for a first time interval at a first rate of pulse generation per time interval, the first rate having a value of 1 plus an integer portion of a desired fractional rate of pulse generation per time interval; and
      determine a placement of pulses for a second time interval following the first time interval at a second rate having a value of the integer portion of the desired fractional rate of pulse generation; and
   generate the pulses across the time intervals according to the determined placement to drive the motion device to move the object.

2. The system of claim 1,
   wherein in determining the placement of pulses for each of the plurality of time intervals, the motion control software program is executable by the processor to:
   use a delay to place each pulse at an arbitrary location within one of the time intervals.

3. The system of claim 1,
   wherein the time intervals are variable in length.

4. The system of claim 1,
   wherein the time intervals are fixed in length.

5. The system of claim 4,
   wherein in determining the placement of pulses for each of the plurality of time intervals, the motion control software program is executable by the processor to:
   change a pulse rate within one of the time intervals.

6. The system of claim 1,
   wherein the motion device comprises a stepper motor.

7. The system of claim 1, further comprising:
   a power drive which is coupled to the motion device and the motion control system, wherein the power drive is operable to:
   receive the pulses from the motion controller;
   translate the pulses into power signals; and
   send the power signals to the motion device.

8. The system of claim 1,
   wherein the motion control system comprises:
   a computer system; and
   a motion controller.

9. A method for controlling motion of an object, the method comprising:
   determining a placement of pulses for each of a plurality of time intervals, wherein the pulses have an average desired pulse rate across the plurality of time intervals, wherein the quantity of pulses in each of the time intervals is variable, wherein the determining the placement of pulses for each of the plurality of time intervals further comprises:
      determining a placement of pulses for a first time interval at a first rate of pulse generation per time interval, the first rate having a value of 1 plus an integer portion of a desired fractional rate of pulse generation per time interval; and
      determining a placement of pulses for a second time interval following the first time interval at a second rate having a value of the integer portion of the desired fractional rate of pulse generation; and
   generating the pulses across the time intervals according to the determined placement to drive a motion device to move an object.

10. The method of claim 9,
    wherein the determining the placement of pulses for each of the plurality of time intervals further comprises:
    using a delay to place each pulse at an arbitrary location within one of the time intervals.

11. The method of claim 9,
    wherein the time intervals are variable in length.

12. The method of claim 9,
    wherein the time intervals are fixed in length.

13. The method of claim 12,
    wherein the determining the placement of pulses for each of the plurality of time intervals further comprises:
    changing a pulse rate within one of the time intervals.

14. The method of claim 9,
    wherein the motion device comprises a stepper motor.

15. The method of claim 9,
    wherein the motion device is coupled to a motion control system, wherein the motion control system includes a processor and a memory medium, and wherein the memory medium stores a motion control software program.

16. The method of claim 15,
wherein the motion control system comprises:
a computer system; and
a motion controller.

17. The method of claim 15,
wherein a power drive is coupled to the motion device and the motion control system, and wherein the power drive is operable to:
receive the pulses from the motion controller;
translate the pulses into power signals; and
send the power signals to the motion device.

18. A carrier medium comprising program instructions for controlling motion of an object, wherein the program instructions are executable by a motion control system to implement:
determining a placement of pulses for each of a plurality of time intervals, wherein the pulses have an average desired pulse rate across the plurality of time intervals, wherein the quantity of pulses in each of the time intervals is variable, wherein the determining the placement of pulses for each of the plurality of time intervals further comprises:
determining a placement of pulses for a first time interval at a first rate of pulse generation per time interval, the first rate having a value of 1 plus an integer portion of a desired fractional rate of pulse generation per time interval; and
determining a placement of pulses for a second time interval following the first time interval at a second rate having a value of the integer portion of the desired fractional rate of pulse generation; and
generating the pulses across the time intervals according to the determined placement to drive a motion device to move an object.

19. The carrier medium of claim 18,
wherein the determining the placement of pulses for each of the plurality of time intervals further comprises:
using a delay to place each pulse at an arbitrary location within one of the time intervals.

20. The carrier medium of claim 18,
wherein the time intervals are variable in length.

21. The carrier medium of claim 18,
wherein the time intervals are fixed in length.

22. The carrier medium of claim 21,
wherein the determining the placement of pulses for each of the plurality of time intervals further comprises:
changing a pulse rate within one of the time intervals.

23. The carrier medium of claim 18,
wherein the motion device comprises a stepper motor.

24. The carrier medium of claim 18,
wherein the motion control system comprises:
a computer system; and
a motion controller.

25. The carrier medium of claim 24,
wherein a power drive is coupled to the motion device and the motion control system, and wherein the power drive is operable to:
receive the pulses from the motion controller;
translate the pulses into power signals; and
send the power signals to the motion device.

26. A system for controlling motion of an object, the system comprising:
a motion device which is operable to move the object;
a motion control system which is coupled to the motion device, wherein the motion control system includes a processor and a memory medium, wherein the memory medium stores a motion control software program, wherein the motion control software program is executable by the processor to:
determine a placement of one or more pulses for each of at least a subset of a plurality of time intervals, wherein two or more of the at least a subset of the plurality of time intervals have differing quantities of pulses, wherein each time interval that includes one or more pulses includes a first pulse and a last pulse, and wherein a deadband between the start of the last pulse in the time interval and the end of the time interval is no larger than a largest pulse period in the time interval; and
generate the pulses across the time intervals according to the determined placement to drive the motion device to move the object in a substantially smooth manner.

27. The system of claim 26,
wherein in determining the placement of one or more pulses for each of at least a subset of the plurality of time intervals, the motion control software program is executable by the processor to:
determine a placement of pulses for a first time interval according to a first pulse period, the first pulse period having an integer value corresponding to a desired fractional pulse period for the first time interval; and
determine a placement of pulses for a second time interval following the first time interval according to a second pulse period, the second pulse period having an integer value corresponding to a desired fractional pulse period for the second time interval.

28. The system of claim 27,
wherein each of the plurality of time intervals has a corresponding desired fractional pulse period based on:
a desired behavior of the motion control device over the plurality of time intervals; and
an actual behavior of the motion control device at the beginning of the time interval.

29. The system of claim 26,
wherein in determining the placement of one or more pulses for each of at least a subset of the plurality of time intervals, the motion control software program is executable by the processor to:
use a delay to place each pulse at an arbitrary location within one of the time intervals.

30. The system of claim 26,
wherein the time intervals are variable in length.

31. The system of claim 26,
wherein the time intervals are fixed in length.

32. The system of claim 31,
wherein in determining the placement of one or more pulses for each of at least a subset of the plurality of time intervals, the motion control software program is executable by the processor to:
change a pulse period within one of the time intervals.

33. The system of claim 26, wherein at least one of the time intervals has a single pulse, wherein the first pulse of the time interval is the last pulse of the time interval.

34. The system of claim 26, wherein at least one of the plurality of time intervals has zero pulses.

35. The system of claim 26, wherein the pulses have an desired average pulse period across the plurality of time intervals.

36. The system of claim 26,
wherein the motion device comprises a stepper motor.

37. The system of claim 26, further comprising:
a power drive which is coupled to the motion device and the motion control system, wherein the power drive is operable to:
receive the pulses from the motion controller;
translate the pulses into power signals; and
send the power signals to the motion device.

38. The system of claim 26,
wherein the motion control system comprises:
a computer system; and
a motion controller.

39. A method for controlling motion of an object, the method comprising:
determining a placement of one or more pulses for each of at least a subset of a plurality of time intervals, wherein two or more of the at least a subset of the plurality of time intervals have differing quantities of pulses, wherein each time interval that includes one or more pulses includes a first pulse and a last pulse, and wherein a deadband between the start of the last pulse in the time interval and the end of the time interval is no larger than a largest pulse period in the time interval; and
generating the pulses across the time intervals according to the determined placement to drive a motion device to move an object in a substantially smooth manner.

40. The method of claim 39, wherein the determining the placement of one or more pulses for each of at least a subset of the plurality of time intervals further comprises:
determining a placement of pulses for a first time interval according to a first pulse period, the first pulse period having an integer value corresponding to a desired fractional pulse period for the first time interval; and
determining a placement of pulses for a second time interval following the first time interval according to a second pulse period, the second pulse period having an integer value corresponding to a desired fractional pulse period for the second time interval.

41. The method of claim 40,
wherein each of the plurality of time intervals has a corresponding desired fractional pulse period based on:
a desired behavior of the motion control device over the plurality of time intervals; and
an actual behavior of the motion control device at the beginning of the time interval.

42. The method of claim 38,
wherein the determining the placement of one or more pulses for each of at least a subset of the plurality of time intervals further comprises:
using a delay to place each pulse at an arbitrary location within one of the time intervals.

43. The method of claim 38,
wherein the time intervals are variable in length.

44. The method of claim 38,
wherein the time intervals are fixed in length.

45. The method of claim 44,
wherein the determining the placement of one or more pulses for each of at least a subset of the plurality of time intervals further comprises:
changing a pulse period within one of the time intervals.

46. The method of claim 38, wherein at least one of the time intervals has a single pulse, wherein the first pulse of the time interval is the last pulse of the time interval.

47. The method of claim 38, wherein at least one of the plurality of time intervals has zero pulses.

48. The method of claim 38, wherein the pulses have an average desired pulse period across the plurality of time intervals.

49. The method of claim 38,
wherein the motion device comprises a stepper motor.

50. The method of claim 38,
wherein the motion device is coupled to a motion control system, wherein the motion control system includes a processor and a memory medium, and wherein the memory medium stores a motion control software program.

51. The method of claim 50,
wherein the motion control system comprises:
a computer system; and
a motion controller.

52. The method of claim 50,
wherein a power drive is coupled to the motion device and the motion control system, and wherein the power drive is operable to:
receive the pulses from the motion controller;
translate the pulses into power signals; and
send the power signals to the motion device.

53. The method of claim 38, wherein at least one of the time intervals has a single pulse, wherein the first pulse of the time interval is the last pulse of the time interval.

54. A carrier medium comprising program instructions for controlling motion of an object, wherein the program instructions are executable by a motion control system to implement:
determining a placement of one or more pulses for each of at least a subset of a plurality of time intervals, wherein two or more of the at least a subset of the plurality of time intervals have differing quantities of pulses, wherein each time interval that includes one or more pulses includes a first pulse and a last pulse, and wherein a deadband between the start of the last pulse in the time interval and the end of the time interval is no larger than a largest pulse period in the time interval; and
generating the pulses across the time intervals according to the determined placement to drive a motion device to move an object in a substantially smooth manner.

55. The carrier medium of claim 54, wherein the determining the placement of one or more pulses for each of at least a subset of the plurality of time intervals further comprises:
determining a placement of pulses for a first time interval according to a first pulse period, the first pulse period having an integer value corresponding to a desired fractional pulse period for the first time interval; and
determining a placement of pulses for a second time interval following the first time interval according to a second pulse period, the second pulse period having an integer value corresponding to a desired fractional pulse period for the second time interval.

56. The method of claim 55,
wherein each of the plurality of time intervals has a corresponding desired fractional pulse period based on:
a desired behavior of the motion control device over the plurality of time intervals; and
an actual behavior of the motion control device at the beginning of the time interval.

57. The carrier medium of claim 54,
wherein the determining the placement of one or more pulses for each of at least a subset of the plurality of time intervals further comprises:

using a delay to place each pulse at an arbitrary location within one of the time intervals.

58. The carrier medium of claim 54,
wherein the time intervals are variable in length.

59. The carrier medium of claim 54,
wherein the time intervals are fixed in length.

60. The carrier medium of claim 59,
wherein the determining the placement of one or more pulses for each of at least a subset of the plurality of time intervals further comprises:
changing a pulse period within one of the time intervals.

61. The carrier medium of claim 54, wherein at least one of the time intervals has a single pulse, wherein the first pulse of the time interval is the last pulse of the time interval.

62. The carrier medium of claim 54, wherein at least one of the plurality of time intervals has zero pulses.

63. The carrier medium of claim 54, wherein the pulses have an average desired pulse period across the plurality of time intervals.

64. The carrier medium of claim 54, wherein the motion device comprises a stepper motor.

65. The carrier medium of claim 57,
wherein the motion control system comprises:
a computer system; and
a motion controller.

66. The carrier medium of claim 64,
wherein a power drive is coupled to the motion device and the motion control system, and wherein the power drive is operable to:
receive the pulses from the motion controller,
translate the pulses into power signals; and
send the power signals to the motion device.

67. The carrier medium of claim 54, wherein at least one of the time intervals has a single pulse, wherein the first pulse of the time interval is the last pulse of the time interval.

68. A system for controlling motion of an object, the system comprising:
a motion device which is operable to move the object;
a motion control system which is coupled to the motion device, wherein the motion control system includes a processor and a memory medium, wherein the memory medium stores a motion control software program, wherein the motion control software program is executable by the processor to:
determine a desired overall average step pulse period for a plurality of time intervals, wherein the desired overall average step pulse period is a non-integer number of clock cycles;
determine a desired average step pulse period for each of the plurality of time intervals, wherein at least a subset of the desired average step pulse periods have a non-integer number of clock cycles;
for each interval of the plurality of intervals, perform one or more of:
determine one or more actual step pulse periods, each having an integer number of clock cycles; and
modify the interval;
wherein the one or more actual step pulse periods and/or the modified intervals for the plurality of intervals approximate the desired overall average step pulse period over the plurality of time intervals;
determine a placement of pulses for each of the plurality of time intervals based on one or more of:
the determined one or more actual step pulse intervals; and
the modified intervals; and
generate the pulses across the plurality of time intervals according to the determined placement to drive the motion device to move the object in a substantially smooth manner.

69. A method for controlling motion of an object, the method comprising:
determining a desired overall average step pulse period for a plurality of time intervals, wherein the desired overall average step pulse period is a non-integer number of clock cycles;
determining a desired average step pulse period for each of the plurality of time intervals, wherein at least a subset of the desired average step pulse periods have a non-integer number of clock cycles;
for each interval of the plurality of intervals, perform one or more of:
determining one or more actual step pulse periods, each having an integer number of clock cycles; and
modifying the interval;
wherein the one or more actual step pulse periods and/or the modified intervals for the plurality of intervals approximate the desired overall average step pulse period over the plurality of time intervals;
determining a placement of pulses for each of the plurality of time intervals based on one or more of:
the determined one or more actual step pulse intervals; and
the modified intervals; and
generating the pulses across the plurality of time intervals according to the determined placement to drive a motion device to move the object in a substantially smooth manner.

70. A carrier medium comprising program instructions for controlling motion of an object, wherein the program instructions are executable by a motion control system to implement:
determining a desired overall average step pulse period for a plurality of time intervals, wherein the desired overall average step pulse period is a non-integer number of clock cycles;
determining a desired average step pulse period for each of the plurality of time intervals, wherein at least a subset of the desired average step pulse periods have a non-integer number of clock cycles;
for each interval of the plurality of intervals, perform one or more of:
determining one or more actual step pulse periods, each having an integer number of clock cycles; and
modifying the interval;
wherein the one or more actual step pulse periods and/or the modified intervals for the plurality of intervals approximate the desired overall average step pulse period over the plurality of time intervals;
determining a placement of pulses for each of the plurality of time intervals based on one or more of:
the determined one or more actual step pulse intervals; and
the modified intervals; and generating the pulses across the plurality of time intervals according to the determined placement to drive a motion device to move the object in a substantially smooth manner.

* * * * *